United States Patent

Little

[15] 3,685,398
[45] Aug. 22, 1972

[54] HYDRAULIC CYLINDER

[72] Inventor: William E. Little, West Burlington, Iowa

[73] Assignee: J. I. Case Company, Racine, Wis.

[22] Filed: May 28, 1971

[21] Appl. No.: 148,071

Related U.S. Application Data

[62] Division of Ser. No. 27,792, April 13, 1970, Pat. No. 3,611,881.

[52] U.S. Cl. .................................92/165, 92/168
[51] Int. Cl. .............................................F16j 15/16
[58] Field of Search.................................92/165, 168

[56] References Cited

UNITED STATES PATENTS

| | | | |
|---|---|---|---|
| 2,985,140 | 5/1961 | Fagge | 92/168 |
| 2,451,089 | 10/1948 | Hunter | 92/168 |
| 2,880,707 | 4/1959 | McCarthy | 92/168 |
| 3,559,540 | 2/1971 | Sheldon | 92/168 X |

Primary Examiner—Martin P. Schwadron
Assistant Examiner—Ronald H. Lazarus
Attorney—Cullen, Settle, Sloman & Cantor

[57] ABSTRACT

A fluid cylinder and piston assembly which comprises an elongated housing defining a fluid chamber to one end of which is secured an attaching member having an eye for securement to a force absorbing member and a piston and piston rod contained in the fluid chamber for reciprocation therein. The piston is welded to one end of the piston rod and the other end of the piston rod extends outwardly of the elongated fluid chamber and is provided with a screw-in attachment eye for securement to force transmitting member. At the rod end of the elongated housing a removable cartridge is provided carrying a rod seal for sealing the cylinder chamber and a retainer member or gland is screwed into the cartridge from the outside of the cylinder for protection and retainment of the rod seal carried by the removable cartridge and which is provided with a wiper seal to continuously wipe the surface of the piston rod. The screwed-in eye connection at the end of the piston rod is provided with a tapered surface engaging a tapered surface within the piston rod end to lock the eye attachment member to the piston rod in such fashion as to remove load stresses from the threaded connection.

4 Claims, 4 Drawing Figures

PATENTED AUG 22 1972

INVENTOR
WILLIAM E. LITTLE

BY:
CULLEN, SETTLE, SLOMAN & CANTOR
ATT'YS.

INVENTOR
WILLIAM E. LITTLE

BY:
CULLEN, SETTLE, SLOMAN & CANTOR
ATT'YS.

HYDRAULIC CYLINDER

This application is a divisional application of my copending application for U.S. Pat., Ser. No. 27,792, filed Apr. 13, 1970, now U.S. Pat. No. 3611881.

BACKGROUND OF THE INVENTION

The present invention relates to fluid cylinder and piston rod assemblies and more in particular to a fluid cylinder assembly of the expendable link or linear actuator type having connecting members at both ends for connection to force absorbing or force transmitting members.

Fluid cylinders and piston rod assemblies such as hydraulic linear actuators are widely employed in air craft installations and earth moving and construction machinery to function as an extendable link or jack to operate various devices. Due to the relative length of these linear actuators, various problems have been encountered in properly securing the piston to the end of the piston rod and maintaining the piston rod throughout its length in centered axial alignment within the cylinder chamber which requires an accurate bearing support for the piston rod at the other end of the cylinder opposite from the piston end which needs to have a bore accurately centered in concentric relationship relative to the longitudinal axis of the cylinder chamber.

A further problem has been encountered in maintaining an effective seal between the piston rod and the cylinder chamber which would positively prevent any leakage therefrom and at the same time would be accessible for replacement or servicing. This, in the past, was extremely difficult to accomplish, particularly in view of the requirement of providing a concentric rod bearing at the open end of the cylinder chamber to obtain the required rod alignment and piston rod support.

A further, and more serious difficulty, has been encountered in properly securing a connecting member to the end of the piston rod extending outwardly of the cylinder. This connecting member at the end of the piston rod is subject to high loading stresses during operation of the linear actuator and the connection between the piston rod and the connecting member is subject to extreme wear. Although the connecting member could be made integral with the piston rod end such as by means of a forging, this is not desirable, since it would preclude servicing of the seal and piston rod bearing at the open end of the cylinder through which the piston rod extends. Thus, the connecting member generally is screwed into the piston rod end for selective removal of the connecting member from the piston rod if the seal and rod bearing assembly has to be serviced. However, the plain, screwed-in connection has been found to be unsatisfactory particularly when subjected to extreme loading as is frequently encountered by the use of such linear actuators in construction or earth moving machinery. Under a heavy load the threaded connection of the connecting member and the piston rod wears out quickly and the connecting member has to be replaced, and the threads in the piston rod have to be reworked frequently to maintain a solid connection.

SUMMARY OF THE INVENTION

In consideration of the above difficulties and disadvantages of conventional fluid cylinders, such as linear hydraulic actuators, the present invention provides an improved fluid cylinder and piston rod assembly which obviates most of the aforegoing disadvantages.

The fluid cylinder and piston rod assembly of the present invention comprises an elongated cylinder having fluid inlets disposed at opposite ends thereof. One end of the cylinder is closed by a connecting member provided with an eye or the like, normally for connection to a stationary part or nonmovable member of the machinery or hydraulic system in which the fluid cylinder is being used. The elongated cylinder provides a fluid chamber for reception of a piston and piston rod assembly longitudinally movably disposed therein. The piston is permanently welded to one end of the piston rod and correctly centered in coaxial relation relative to the central longitudinal axis of the fluid cylinder. The cylinder is subject to selective fluid pressure at either end to selectively extend the piston rod from the cylinder or retract the piston rod within the cylinder to thereby lengthen or shorten the effective length of the linear actuator.

The welded-on piston and piston rod construction is preferred to insure longer piston and cylinder life because of the elimination of separate retainer members to secure the piston to the piston rod.

The other end of the elongated cylinder receives a removable cylindrical cartridge which has a central bore for the extension of the piston rod therethrough and which carries the piston rod seal. Removably secured within the cartridge from the outside thereof is a cylindrical sleeve performing a multiple function, i.e., the sleeve acts (1) as a sealing gland for retainment and protection of the rod seal, (2) as a carrier for a wiper seal outwardly of the assembly for continuously wiping the piston rod and, (3) as a rod bearing concentrically aligned relative to the central longitudinal axis of the cylinder to maintain the piston rod, in all phases of operation, in correct centered alignment. The piston rod bearing is of such axial length so as to provide sufficient axial support for the piston rod to prevent the introduction of excessive bending stresses to the piston rod under application of loads misaligned with the axis of the rod.

A connecting member is removably attached to the outer end of the piston rod to permit easy access and servicing of the rod seal and bearing assembly by removal of the connecting member from the rod. The connecting member is provided with a threaded shank, and the rod end is provided with a cooperating threaded bore to receive the threaded shank.

The threaded bore in the rod end is provided with an outwardly tapered portion providing a shoulder between the tapered portion and the threaded portion of the bore. The connecting member is likewise provided with a tapered portion for mating engagement with the internal tapered portion in the piston rod bore and a groove is provided on the shank of the connecting member between the threaded portion of the shank and the tapered portion.

Upon engaging of the threaded shank portion of the connecting member within the threaded end of the piston rod and screwing the connecting member inwardly the connecting member becomes seated against the shoulder within the bore of the rod just prior to engagement of the cooperating tapered surfaces on the connecting member and in the bore. Further tightening of the connecting member within the bore at a predetermined torque causes full engagement of the two tapered surfaces and ultimately causing the material of the shoulder portion in the rod bore to be deformed radially into the groove of the connecting member to thereby rigidly lock in the connecting member from the piston rod. Removal of the connecting member from the piston rod end is accomplished by application of a reverse torque in which instance the shoulder formed by the groove adjacent the threaded shank portion of the connecting member displaces the plastically deformed shoulder material within the bore of the piston rod end outwardly to permit removal of the shank portion from the bore.

The present construction provides various technical advantages over conventional linear actuators having a piston rod and removable connecting members attached thereto. The tapered engagement of the tapered portion on the connecting member with the internally tapered portion of the bore provides a two-folded purpose of great advantage by first: causing plastic deformation of material in the bore of the rod to flow into a retaining groove provided on the shank portion of of the connecting member to thereby securely and rigidly locking the connecting member to the rod and, secondly: providing a load bearing surface between the rod and the connecting member which is not subject to any wear and which additionally removes any load from the threaded connection which, as explained earlier, has been the primary source of early breakdown at the rod end and connecting member.

The removable connecting member also provides for easy servicing of the rod seal and bearing assembly, removably retained in the cylinder end.

Further features and advantages of the present invention will become readily apparent by reference to the following detailed description to be read in connection with the appended drawings which illustrate a preferred form of embodiment.

DESCRIPTION OF THE PREFERRED EMBODIMENT

Figure 1:
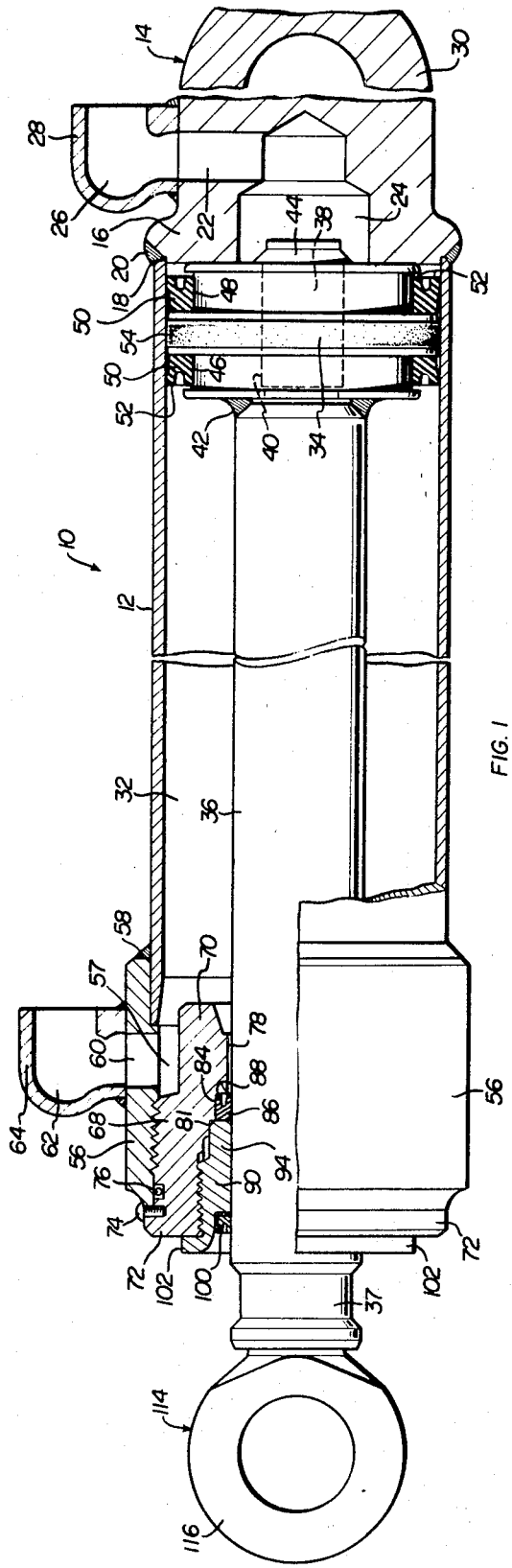
FIG. 1 illustrates a cylinder and piston rod assembly of the linear actuator type shown partly in cross-section and embodying the features of the present invention.
Figure 2:
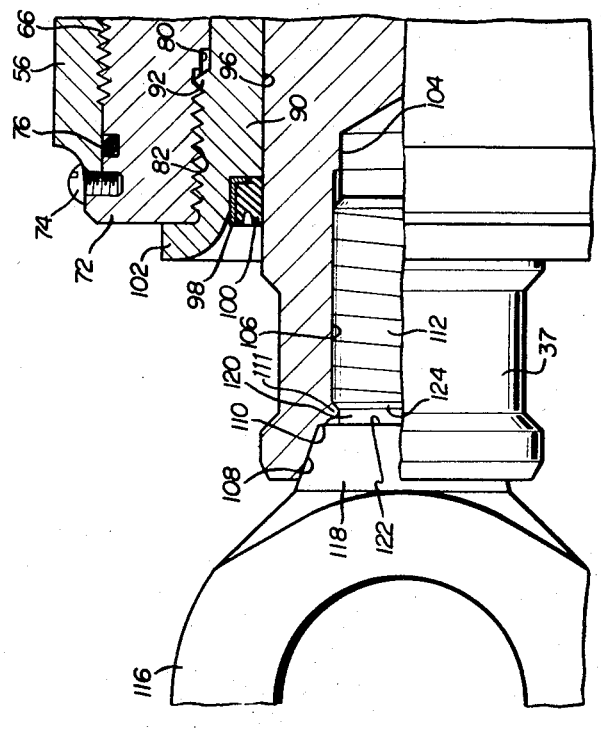
FIG. 2 is an enlarged partial sectional view of the rod end of the cylinder assembly shown in FIG. 1.

With reference to FIG. 1 there is shown a fluid cylinder and piston assembly of the hydraulic linear actuator type generally indicated at 10 comprised of an enlongated cylindrical member or tube 12 which is opened at both ends. Attached to one end of the tube 12 is a connecting member 14 which has a cylindrical inner end 16 providing a pilot portion 18 adapted to fit into the end of the tube 12. The cylindrical inner end 16 is welded at 20 to the tube 12 to provide a fluid tight assembly between the connection member 14 and the tube 12.

The connecting member 14 has a fluid inlet 22 which is in communication with a pressure chamber 24 within the cylindrical inner end portion 16. Outwardly, the fluid inlet 22 communicates with the bore 26 of an inlet fitting 28 attached to the connecting member 14 by means of welding or the like.

It will be understood that the inlet end of the fitting 28 is conventionally connected to a source of fluid under pressure (not shown) to selectively supply fluid under pressure into the pressure chamber 24.

The connecting member 14, attached to the tube 12, is rearwardly provided with an eye 30 adapted for connection to a stationary or actuated member (not shown) provided on the machinery in which the linear actuator is embodied. The use of linear actuators and their installations in earth moving machinery or the like, to operate the various implements or auxiliary attachments of the machine, is widely known in the art and need not further be described.

The tubular member 12 forms an elongated cylinder providing an elongated fluid chamber 32 in which is disposed for reciprocation a piston 34 secured to the end of a piston rod 36 which extends in axially centered relationship longitudinally through the chamber 32 towards the front end of the tubular member 12.

The piston 34 is attached to the end 38 of the piston rod 36 by means of splines or serrations 40 and is thereafter ring welded to the piston rod 36 as at 42 and 44 at both sides of the piston 34. This attachment of the piston 34 to the piston rod 36 provides a rigid permanent connection adapted to maintain the piston and the piston rod in correct axially centered relationship within the chamber 32 of the tubular cylinder portion 12.

Opposite radial recesses 46 and 48 are provided to extend circumferentially around the external surface of the piston and which each receive a sealing member 50 each having a U-shape lip portion 52 resiliently contacting the internal surface 33 of the cylinder chamber 32 to seal both sides of the piston 34 to prevent fluid from passing from one side of the piston to the other under application of fluid pressure into the chamber 24 or 32. Centrally, the piston 34 is provided with a circumferentially extending wear ring 54 which, if necessary, can be periodically replaced.

The welded-on piston assembly eliminates the need for separate piston retaining members and assures a rigid attachment of the piston to the piston rod and maintenance of axial alignment of the piston and piston rod relative to each other and to the cylinder chamber 32 during operation.

The other end of the cylindrical or tubular member 12 extends into one end of a tubular extension 56 and is welded thereto as at 58. The tubular extension 56 comprises the rod end of the linear actuator 10 and is provided with a fluid inlet opening 60 communicating with a bore 62 provided in a fluid inlet fitting 64. As usual, and as will be understood, the inlet fitting 64 which is normally welded to the extension 56 is fluidly connected to a source of fluid under pressure (not shown) for introduction of fluid into a chamber 57 of the extension 56. The chamber 57 of the extension 56 is in constant fluid communication with the cylinder chamber 32 forwardly of the piston 34.

The front end of the tubular extension 56 is internally threaded as at 66 and receives a sleeve type cartridge 68 which has a reduced diameter inner end portion 70 extending towards the tubular member 12. The reduced diameter inner end portion 70 permits fluid to pass from the inlet 60 through the chamber 57 and into the cylinder chamber 32. The outer end of the sleeve type cartridge 68 is provided with a radial flange 72 adapted for abutment against the outer end of the tubular extension 56. A screw 74 is provided at the interfaces between the cartridge flange 72 and the outer end of the tubular extension 56 to prevent the cartridge 68 from breaking loose.

The cartridge 68 is provided adjacent its outer end with an external radial sealing member 76 providing a fluid tight seal between the external surface of the cartridge and the internal surface of the tubular extension 56. The cartridge 68 is also provided with an axial bore 78 for the passage of the piston rod 36 therethrough. The bore 78 towards the outer end of the cartridge 68 terminates in an enlarged diameter portion 80 a portion of which is being provided with internal threads 82. Between the piston rod bore 78 and the enlarged diameter portion of the bore 80, a counter-bore 84 is provided and adapted to receive a sealing member 86. The sealing member 86 is provided with U-shaped lip formations 88 adapted to resiliently abut against the internal surface of the counter-bore 84 and the external surface of the piston rod 36 in sealing contact herewith.

The enlarged diameter bore portion 80 of the cartridge 68 is adapted to removably receive a gland member or seal retainer 90 provided with external threads 92 adapted to mate with the internal threads 82 in the bore portion 80. The inner end 94 of the seal retainer 90 is adapted, in assembly, to abut inwardly against a shoulder 81 formed internally in the cartridge member 68 between the counter-bore 84 and the enlarged diameter bore portion 80 to thereby completely cover the rod sealing member 86 for protection against contamination from the outside.

The seal retainer 90 is provided with an axial bore for the passage of the piston rod 36 therethrough having an internal diameter closely fitting the external diameter of the piston rod 36 so that the inner surface 96 of the retainer bore provides a radial bearing surface for the piston rod 36 in sliding bearing contact therewith. The axial bore of the seal retainer member 90 is machined such as to be correctly centered to be concentric with the longitudinal axis of the cylinder 12 so as to maintain the relatively long piston rod 36 in axially centered position relative to the piston 34 during extension or contracting movement of the piston rod in and out of the cylinder 12. The radial bearing surface 96 of the seal retainer 90 is of sufficient axial length so as to provide a rigid support for the piston rod 36 to thereby reduce bending stresses on the piston rod under load.

The other end of the seal retainer 90 is counterbored as of 98 to receive an external sealing member 100 adapted for sealing and wiping contact with the external surface of the piston rod 36 externally of the cylinder assembly. The outer end of the seal retainer 90 is also formed into a hexagonal flange portion 102 provided for the application of a wrench thereto to tightly screw the seal retainer into the cartridge 68 until the flange 102 comes into abutment against the outer surface of the cartridge 68 and the inner end 94 of the seal retainer is seated against the inner radial and axial shoulder 81 provided adjacent the counterbore 84 of the cartridge.

It will be seen from the foregoing, that the combined cartridge and seal retainer assembly at the operating or rod end of the linear actuator provides an effective and easily servicable sealing means for the outwardly extending piston rod 36 and simultaneously provides a rigid radial bearing support for the piston rod. The inner piston rod seal 86 is fully protected by the seal retainer 90 against the entrance of contaminants and the piston rod 36, during operation of the linear actuator, is continuously wiped clean by the external sealing member 100 carried by the seal retainer 90.

The outer end 37 of the piston rod 36 which extends outwardly of the seal retainer 90 is provided with an axially aligned bore 104 having an intermediate threaded portion 106 which terminates into an internally tapered portion 108 at the outer end of the rod forming a shoulder 110 between them.

The threaded portion 106 of the piston rod bore 104 is adapted to receive a threaded shank 112 of a connecting member 114. The connecting member 114 is provided with an eye portion 116 opposite the shank portion 112 adapted for pivotal attachment to a member (not shown) to be actuated by the linear actuator 10.

The eye portion 116 of the connecting member 114 terminates towards the shank portion 112 into a radially tapered portion 118 adapted, in assembly, to mate with the internal tapered portion 108 of the piston rod bore. A radial groove 120 is formed between the threaded shank portion 112 and the tapered portion 118 providing a shoulder 122 at the end of the tapered portion 118 and an opposite shoulder 124 at the end of the threaded shank portion 112.

Figure 3:
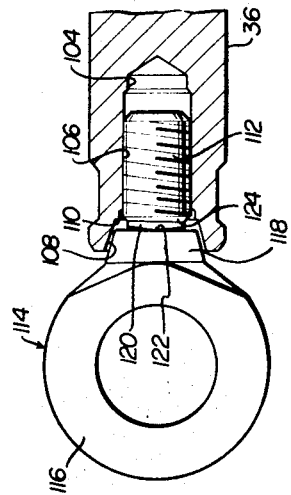
FIG. 3 is a separate view of the rod end showing the connecting member only partly screwed into the rod end.

With particular reference to FIG. 3 which illustrates a sequence in the threading of the connecting member 114 into the piston rod bore 104, it will be seen that as the threaded shank portion 112 of the connecting member advances along the threaded portion 106 inwardly of the piston rod bore 104 the shoulder 122 of the tapered portion 118 first abuts against the shoulder 110 at the inner end of the tapered bore portion 108 in the piston rod bore. Upon initial contact between the shoulders 110 and 122 there still remains an infinite clearance between the tapered surfaces 108 and 118. By application of a torque wrench, adjusted to the required torque, the connecting member 114 is then further rotated inwardly of the piston rod bore 104 whereby the torque applied by the torque wrench overcomes the resistance offered by the internal shoulder 110 and the portion 111 of the material between the internal shoulder 110 and the threaded portion 106 of the piston rod bore will be plastically radially deformed into the groove 120 between the threaded shank portion 112 and the tapered portion 118 of the connecting member 114 to thereby provide a rigid interlock between the connecting member 114 and the end of the piston rod 36.

As the material 111, adjacent the internal shoulder 110 is being radially deformed into the groove 120 the tapered surface 118 of the connecting member is brought into tight wedging contact with the internal tapered surface 108 in the piston rod bore. The mating tapered surfaces 108 and 118 are machined such as to have an interference fit in such manner as to equally distribute the applied torque load to prevent the piston rod end 37 from swelling up towards the outside.

Initially, as mentioned above, the shoulder 122 abuts against the internal shoulder 110. Thereafter, as more torque is applied, the opposite tapered surfaces 108 and 118 come together starting at the shoulder 122. As the torque loading increases by application of the torque wrench to the connecting member 114, the contact between the mating tapered surfaces likewise increases until the gap is completely closed.

Thus, by this arrangement a more effective and rigid connection between the connecting member and the end of the piston rod has been provided.

Figure 4:
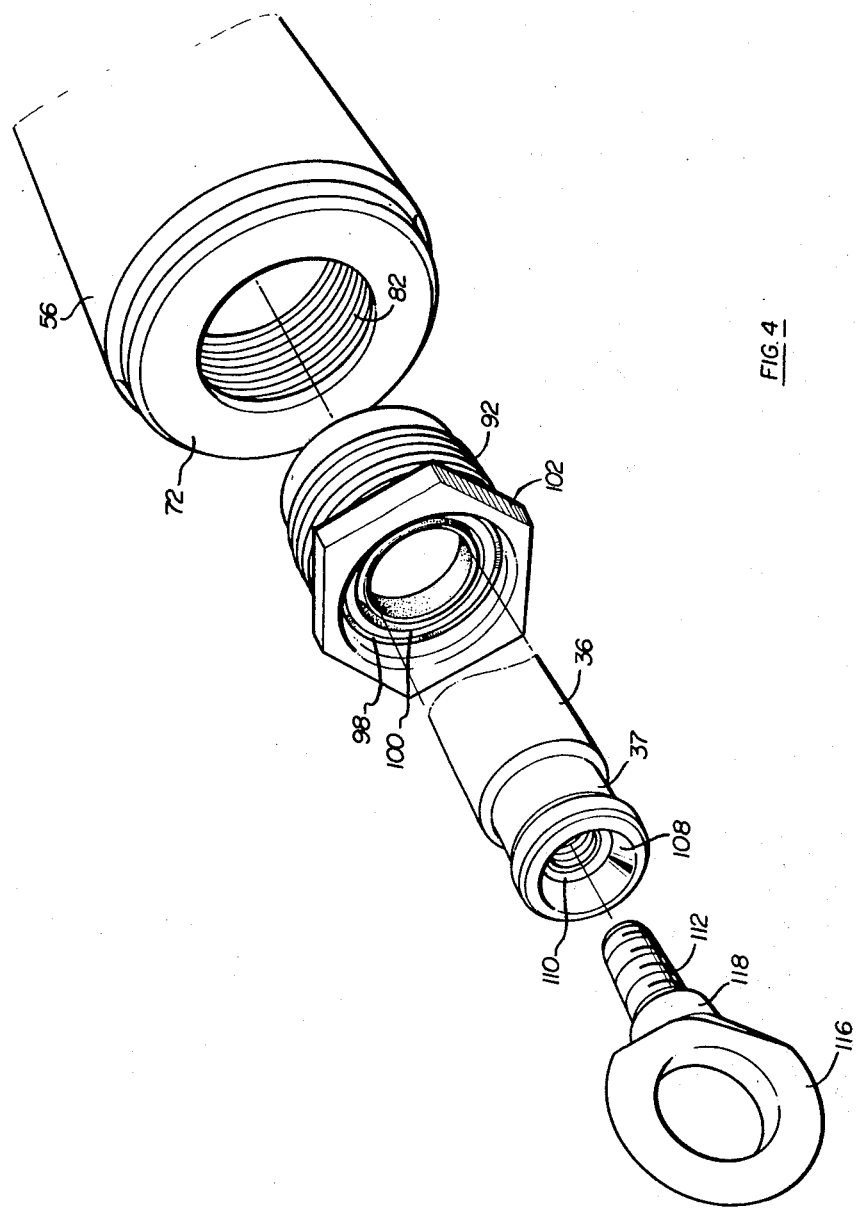
FIG. 4 is a perspective exploded view of the rod end portion of the cylinder assembly shown in FIG. 1.

With reference to the exploded view illustrated in FIG. 4 of the drawings, servicing of the rod end of the linear actuator 10 and the seal assembly thereof is relatively easy to accomplish and the sealing members 86 and 100 can be easily removed without damage.

In order to disassemble the rod end of the cylinder assembly, a reverse torque is applied to the connecting member 114 to screw the threaded shank portion 112 out of the threaded portion 106 of the piston rod bore 104. As the reverse torque is applied to the connecting member, the shoulder 124 formed by the groove 120 adjacent the inner end of the threaded shank portion 112 forces the formerly displaced material 111 radially outwardly of the groove 120 to unlock the threaded shank portion 112 and subsequently irons out the formerly displaced material, so that the shank can be threadedly removed from the piston rod bore 104.

After the connecting member 114 has been thus removed from the piston rod end, the seal retainer member 90 is threaded out of the cartridge member 68 by the application of a wrench to the hexagonal flange portion 102, enabling the member 90 sliding off over the piston rod end. To remove the cartridge 68 from the tubular cylinder member 56, the retaining screw 74 is removed permitting the application of a tool to screw the cartridge out of the tubular member 56 along the threads 66. Thereafter, the cartridge can be removed by sliding it off the piston rod end. Thus, the sealing members 76, 86 and 100 are accessible for easy servicing and replacement, if necessary, where-upon the parts are reassembled again to the rod end of the cylinder in a reverse sequence.

It is evident from the foregoing description and the accompanying illustrations that the present invention provides an improved linear actuator assembly in the form of an elongated hydraulic cylinder closed at one end and reciprocably containing a piston and piston rod assembly in which the relatively long piston rod extends outwardly at the other end of the cylinder.

The piston is welded on the piston rod in order to insure a prolonged piston and cylinder life due to the elimination of separate fastening or retainer members.

The rod end of the elongated cylinder is provided with an easily removable rod-seal carrying cartridge which, in turn, receives a removable, combination seal retainer and rod bearing member which also carries an external wiper seal. The rod bearing, provided by the seal retainer member, assures a sufficient bearing support for the reciprocating piston rod in such manner as to reduce bending stresses on the piston rod under load.

A connecting member in the form of an eye, having a threaded shank portion, is removably secured to the outer piston rod end by means of a threaded connection between the internally threaded piston rod end and the threaded shank portion. Mating tapered surfaces are provided in the piston rod end and on the eye shank adjacent the threaded shank portion for wedging engagement with each other and a radial groove is provided between the threaded shank portion and the tapered portion of the connecting member which is adapted to receive material from the piston rod end displaced by forcing the tapered surfaces in the piston rod end and on the connecting member into a tight engagement with each other to thereby provide a rigid interlock between the members.

This arrangement completely eliminates any load on the threaded connection between the connecting member and the piston rod end since the entire load is taken up at the mating tapered surfaces thereby also reducing load stresses on the piston rod and connecting member.

Thus, by the present improved construction of the rod end of a hydraulic linear actuator the service life of the complete cylinder assembly is increased and down time and repairs will be held at a minimum.

The sealing members 50, 86 and 100 are preferably made of thermo plastic material such as urethane or the like, and will not blow out or extrude as fast as conventional Vee-type seals.

Although the present invention has been described and shown with reference to only one particular embodiment it will be understood that various modifications may be made in the structure and design by a person skilled in the art to which the invention pertains without departing from the spirit and essential characteristic thereof and such modifications are contemplated to be included within the scope of the appended claims.

I claim

1. In a cylinder and piston assembly of the linear actuator type, comprising:

a housing having a tubular fluid chamber open at opposite ends, a first connecting member securely attached to one open end of said chamber closing said one open end, a piston disposed for sealed reciprocation within said chamber, a piston rod secured to said piston and extending through the opposed open end of said chamber, a second connecting member removably secured to the free end of said piston rod, outside of said housing, a first and second fluid inlet spaced along said housing for selective introduction of fluid on opposed sides of said piston, a reinforcing tubular extension secured to said opposed open end of the housing, a sleeve cartridge removably secured within said tubular extension, adjacent the open end of said extension, and having a stepped internal bore including an internally threaded enlarged internal diameter portion adjacent the open end threadably receiving a seal retainer member and a reduced internal diameter portion telescopically receiving said piston rod, but spaced therefrom, said seal retainer member including an elongated internal bore closely receiving said piston rod for reciprocating motion and providing bearing support for said rod, and an end portion, opposite said reduced internal diameter portion of said cartridge, releasably retaining a resilient seal biased against said piston rod to seal said opposed open end of said housing, said cartridge having a reduced external diameter portion, opposite one of said fluid inlets, providing a fluid passage which communicates with said fluid chamber.

2. The cylinder and piston assembly defined in claim 1, characterized in that said seal retainer member includes an annular pocket adjacent the open end and opposite said piston rod which receives an external seal biased against said piston rod.

3. The cylinder and piston assembly defined in claim 1, characterized in that said reinforcing tubular extension has a greater thickness than said tubular chamber and said sleeve cartridge is threadably received within the open end of said reinforcing tubular extension.

4. The cylinder and piston assembly defined in claim 3, characterized in that said tubular extension includes one of said fluid inlets spaced from the internally threaded portion which receives said cartridge.

* * * * *